April 21, 1970 W. R. ROCHELLE ET AL 3,507,126
MARINE APPARATUS FOR SUPPORTING FLEXIBLE ELONGATE
PIPE MEANS DURING UNDERWATER LAYING THEREOF
Filed Jan. 5, 1968 4 Sheets-Sheet 1
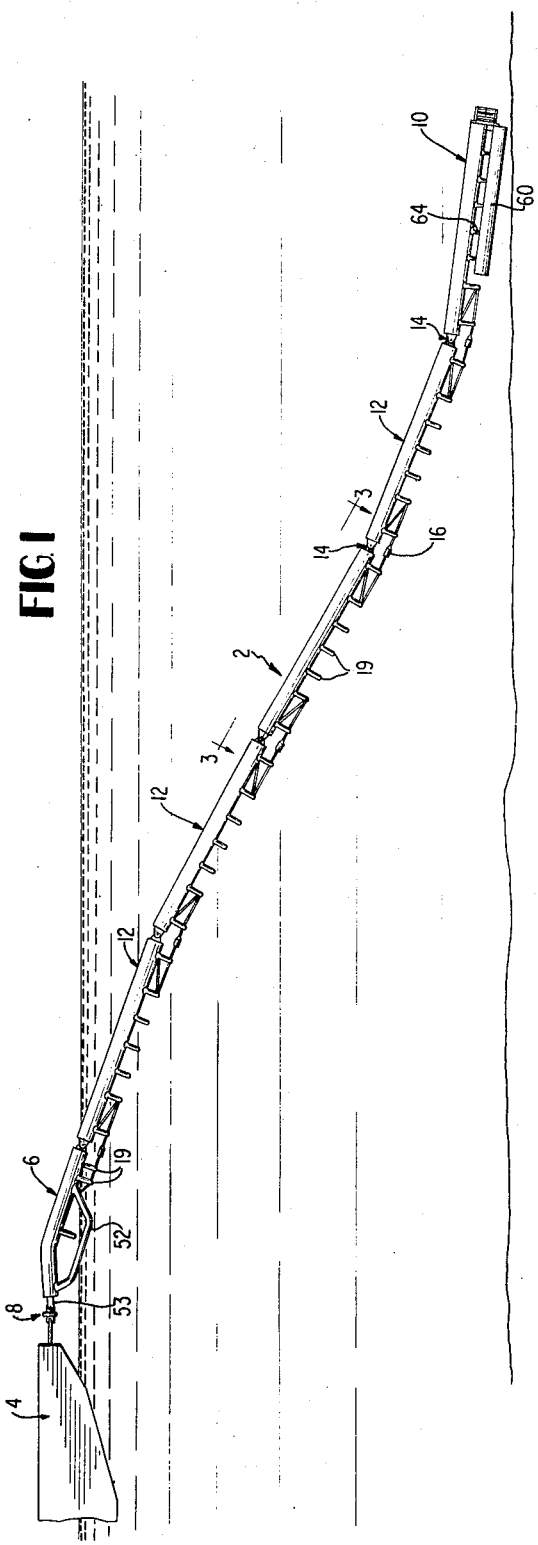
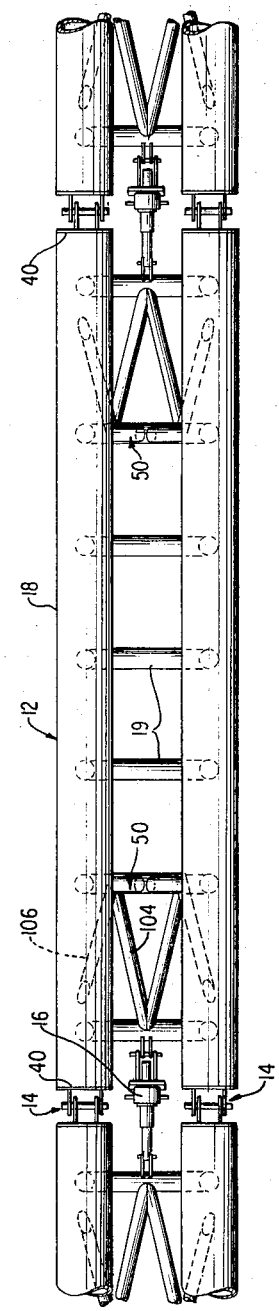
INVENTORS
WILLIAM R. ROCHELLE
JOE C. LOCHRIDGE
ARDESHIR RUSTOMJI DESAI
BY Burns, Doane, Benedict,
Swecker & Mathis
ATTORNEYS

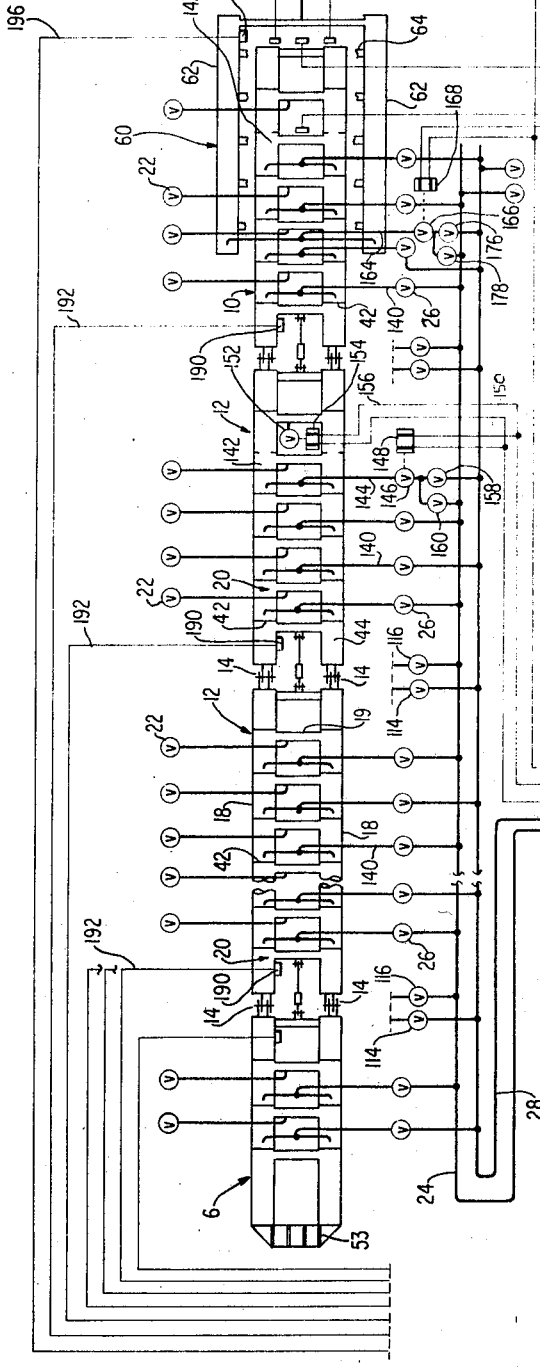

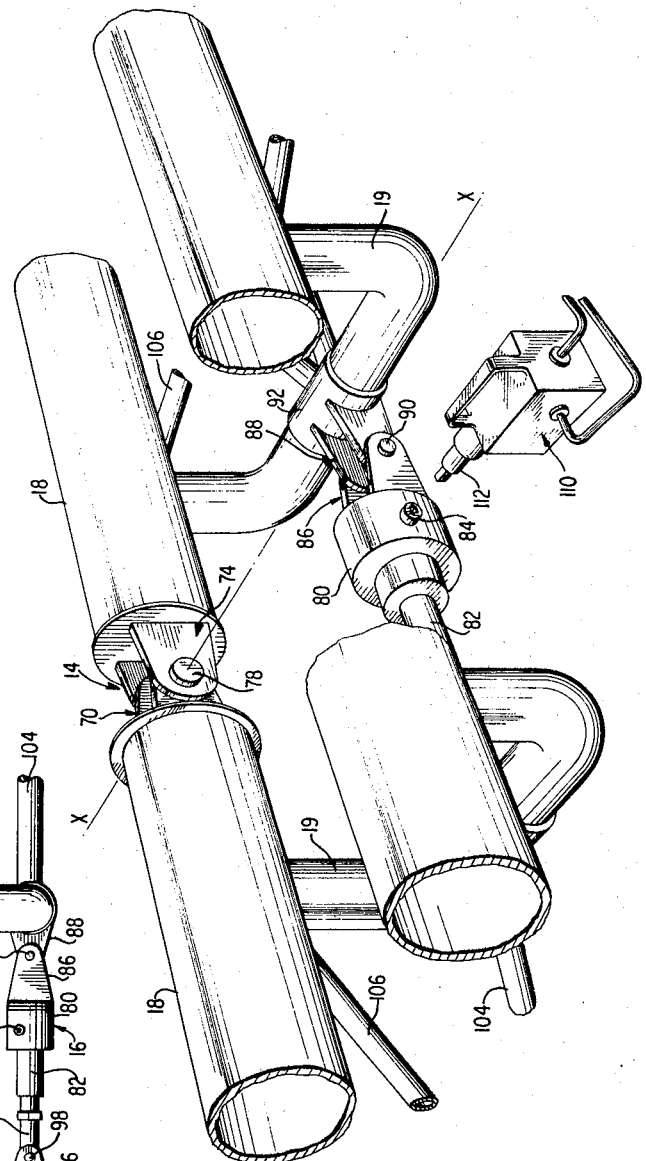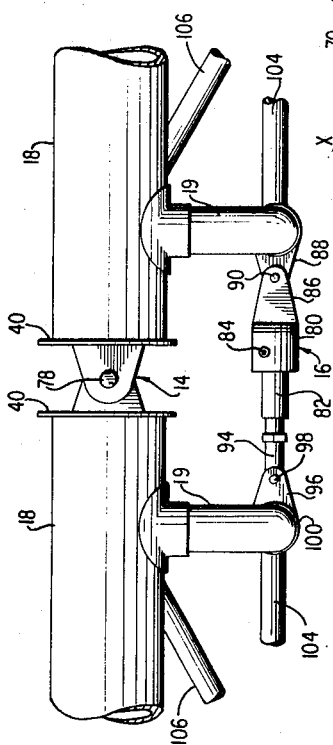

INVENTORS
WILLIAM R. ROCHELLE
JOE C. LOCHRIDGE
ARDESHIR RUSTOMJI DESAI

ATTORNEYS

United States Patent Office 3,507,126
Patented Apr. 21, 1970

3,507,126
MARINE APPARATUS FOR SUPPORTING FLEXIBLE ELONGATE PIPE MEANS DURING UNDERWATER LAYING THEREOF
William R. Rochelle, Joe C. Lochridge, and Ardeshir Rustomji Desai, Houston, Tex., assignors to Brown & Root, Inc., Houston, Tex., a corporation of Texas
Filed Jan. 5, 1968, Ser. No. 696,005
Int. Cl. F16l 1/00
U.S. Cl. 61—72.3
12 Claims

ABSTRACT OF THE DISCLOSURE

A marine apparatus for supporting flexible elongate pipe means during underwater laying thereof from a vessel floating on the surface of a body of water. The apparatus includes a longitudinally extending elongate ramp adapted to be secured at one end to the vessel extending away therefrom generally down into the water. The ramp includes a plurality of longitudinally spaced support members each provided with closed hollow chamber portions to provide each member with at least partial buoyancy. Means connecting adjacent support members together includes at least one pivotal connection means positioned between at least one pair of adjacent support members for permitting relative pivotal motion therebetween about a generally horizontal pivot axis. At least one torque applying means is connected with the hinge means for applying torque thereto to selectively vary and thus rigidly or fix the relative inclination of the adjacent support members. Pipe contacting means secured to and spaced along the ramp are adapted to underlie and support the pipe means. Flooding means is connected with the support members for selectively and separately causing the passage of water between the interior and exterior of the various hollow chamber portions of the various support members so that the torque acting about the pivotal connection means may be changed to reduce the effort required to be exerted by the torque applying means.

In another aspect of the invention, load and position sensors are provided on at least one of the support members to give an indication on the vessel of the correct distribution of the pipe on the support member.

A method aspect of the invention involves varying the buoyancy forces exerted by the support members in fixed increments or gradually to balance the net torque acting about the hinge.

BACKGROUND OF THE INVENTION

This invention relates to marine apparatus for supporting flexible elongate pipe or the like during underwater pipelying operations.

In performing underwater pipelying operations and the like which involve the laying of pipe from a floating surface vessel to the bed of a body of water, it is important that the elastic limit of the pipe should not be unduly exceeded. If the radius of curvature of the pipe is too small, the pipe may become permanently deformed, cracked or otherwise rendered unserviceable.

In order to prevent such undesirable consequences, it is often necessary to provide a partially submerbed ramp underlying the pipe in its path to the seabed to support the pipe in a suitable configuration to avoid damage thereto. Because the particular configuration in which the pipe is required to be supported may need to be varied for a number of reason (such as for example, in laying pipes of different diameter and elasticity or for laying pipes at different depths and in water of differing buoyancy characteristics or for other like reasons), at least one prior attempt has been made to provide a ramp which may be adjusted in use without involving removal from the water or without removal of the pipe from the ramp, to enable it to be used for a variety of pipelying operations.

One such ramp exemplified by French Patent 1,230,014 (Freyssinet) includes a plurality of generally rectangular, trusslike, support members having hollow portions to provide limited, fixed buoyancy. The support members are hingedly connected together at their adjacent upper corners to permit limited articulation of the ramp and are connected at their adjacent lower corners by hydraulic jacks which may be used to rigidify the ramp.

Although ramps of the type described may sometimes be satisfactory, certain serious disadvantages may arise in their operation. For example, the forces acting about any hinge connection include the upwardly acting forces exerted by the fixed buoyancy of the adjacent support members and the downwardly acting forces exerted by the weight of the adjacent portion of the pipe. If these forces are, as may sometimes occur, seriously out of balance there may be a resultant force of sufficient magnitude to exert a greater torque about the hinge than the jack has capacity to react. In this event, serious damage to the jack or even failure may occur. Moreover, using jacks of a hydraulic type to maintain rigidity of the ramp is likely to prove less satisfactory than using a purely mechanical jack, due to the possibility always present in hydraulic systems that there may be a failure of hydraulic pressure in the jack due to leaks, rupture or other like reasons. Additionally, jack failure may permit the adjacent members to assume an unsuitable relative inclination causing damage to the adjacent portion of pipe.

Another problem with articulated ramp structure of the type described is that the positioning of the hinges at the top corners of adjacent support members may permit relative articulation between the members in an upward direction only with relative motion in the other direction being resisted by interference between adjacent portions of the two support members. In order to provide a ramp capable of assuming all the configurations which are likely to be required, it would be preferable to hingedly connect adjacent support members in such a manner as to permit them to be relatively articulated in both concave and convex directions relative to the pipe being laid.

It is also improtant that the pipe should be properly located on the ramp if adequate support is to be provided and for this purpose it is necessary that operators on board the vessel should be provided with a remote indication that proper distribution of the pipe on the ramp is being continuously maintained.

Also important is the security and safety of the jack used to effect articulation between support members and this may be enhanced by locating the jack in such a manner that it is not positioned on an exposed position on the ramp.

SUMMARY OF INVENTION

It is a general object of the invention to provide a marine apparatus for supporting flexible elongate pipe means during underwater laying thereof, which effectively obviates or minimizes problems of the type previously noted.

It is a particular object of the invention to provide marine pipe laying apparatus of the articulated ramp type wherein the buoyancy of the various ramp members may be separately and selectively varied in such a manner as to minimize loads imposed on jack members used to maintain the articulated configuration of the ramp.

It is a further object of the invention to provide marine pipe laying apparatus of the articulated ramp type wherein the ramp members are hingedly connected in such a manner as to permit both concave and convex articulation of adjacent ramp members relative to the pipe being laid.

It is yet another object of the invention to provide marine pipelaying apparatus of the articulated ramp type wherein jacks used to control articulation of the ramp are afforded some measure of protection by adjacent ramp structure to provide additional safety.

It is still a further object of the invention to provide underwater pipelaying apparatus of the articulated ramp type wherein information may be provided to operators positioned remotely on a floating surface vessel to indicate whether the pipe being laid is correctly distributed on the ramp.

One preferred embodiment of the invention intended to accomplish at least some of the foregoing objects comprises a marine apparatus for supporting flexible elongate pipe means during underwater laying thereof from a vessel floating on the surface of a body of water. The apparatus includes a longitudinally extending elongate ramp adapted to be secured at one end thereof to a vessel, extending away therefrom generally downwardly into the water. The ramp includes a plurality of longitudinally spaced support members each of which includes closed hollow chamber portions to provide the support members with at least partial buoyance. Means for connecting adjacent support members together include at least one pivotal connection means positioned between at least one pair of adjacent support members for permitting relative pivotal motion between them about a generally horizontal pivot axis. At least one torque applying means is connected with the hinge means for applying torque thereto to selectively vary the relative inclination of the adjacent support member and to maintain them in predetermined relative inclination. Pipe contacting means secured to and spaced along the ramp are adapted to underlie and support the elongate pipe means. Flooding means are connected with the support members for selectively and separately causing the passage of water between the interior and exterior of the various hollow chamber portions of the support members to selectively and separately vary the buoyancy of the support members so that the torque acting about the pivotal connection means by be selectively changed to reduce the effort required to be exerted by the torque applying means.

In another significant aspect of the invention the previously mentioned flooding means includes a vent header line extending from the vessel generally downwardly along and adjacent the ramp in fluid communication at its upper end with an area of relatively lower gas pressure, such as atmosphere. The previously mentioned hollow chamber portions in the support members are each separately provided with flooding valve means for selectively placing the chamber portion in fluid communication with the surrounding water. Each hollow chamber portion is also separately provided with gas valve means for selectively placing the chamber portion in fluid communication with the vent header line. Each of the various chamber portions may be separately flooded by simultaneously selectively opening its associated flooding and gas valve means to permit water to enter the chamber portion.

Emptying of a flooded chamber portion is effected by connecting the vent header line to a source of gas under high pressure adapted to be positioned on the floating vessel. The gas and flood valve means are then opened as before, but this time the gas under high pressure enters and empties the chamber driving the water out through the flood valve means.

In a further significant aspect of the invention, adjacent support members are provided with opposed vertically and laterally extending end portions with the previously mentioned pivotal connection means fixedly connected with each of the end portions. The pivotal connection means spaces the end portions sufficiently apart to permit the relatively vertical inclination between the adjacent support members to be varied from an acute to an obtuse angle without interference between the adjacent end portions.

Of further significance, the previously mentioned torque applying means includes jack means fixedly connected at opposite ends thereof with each of the adjacent pair of support members, spaced vertically from said pivot axis. The jack means extends and retracts in the direction longitudinal of the support members to rotate the support members relatively about the horizontal pivot axis.

To enable the configuration of the ramp to be adjusted remotely from the floating vessel, power responsive drive means are connected with the jack means. The drive means may be selectively connected to a power source adapted to be positioned on the floating vessel by power connection means extending between the power source and the drive means to operate the jack means.

To provide an indication that the pipe being laid is properly distributed on the ramp to insure proper support for the pipe, load sensors are provided. The load sensors include longitudinally spaced vertical load sensors and laterally spaced side load sensors on one of the support members. The sensors are adapted to contact the pipe means. An improperly distributed configuration of the pipe means on the one support member is indicated by unbalanced signals from the load sensors transmitted to signal responsive indicator means adapted to be positioned on the floating vessel and monitored by the operators.

THE DRAWINGS

One preferred embodiment of the invention is illustrated in the accompanying drawings in which, FIGURE 1 is a simplified side view of a marine apparatus for supporting flexible elongate pipe means utilizing a vessel floating in a body of water, according to a preferred embodiment of the invention;

FIGURE 2 is a top view of a portion of the marine apparatus shown in FIGURE 1;

FIGURE 3 is a schematic top view of the marine apparatus shown in FIGURE 1 showing a flooding apparatus forming a part of the present invention;

FIGURE 4 is a top view of a bottom one of the support members shown in FIGURE 1, showing vertical and side load sensors forming a part of the invention;

FIGURE 5 is a partially broken away, perspective view on an enlarged scale of a pivotal connection between two other support members shown in FIGURE 2;

FIGURE 6 is a side view of the pivotal connection shown in FIGURE 5;

DETAILED DESCRIPTION

General summary

Figure 7:
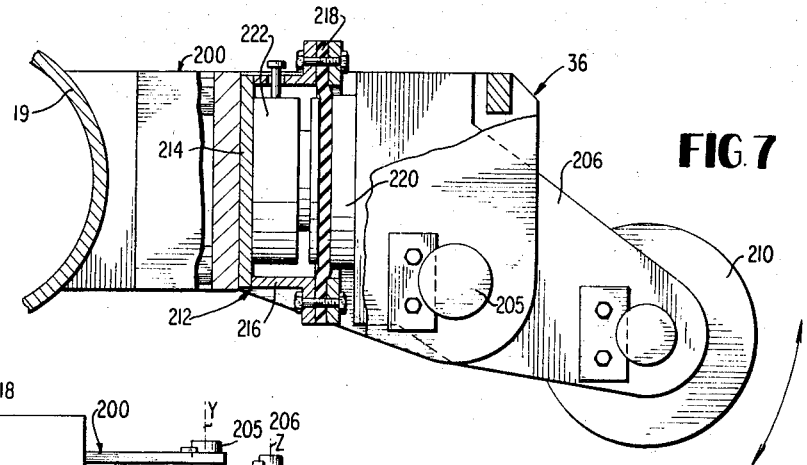
FIGURE 7 is a top view of the side load sensor shown in FIGURE 4.

Referring to FIGURE 1, a preferred embodiment of the invention there shown includes an articulated ramp 2 adapted to underlie and support flexible elongate pipe or the like during the underwater laying thereof from a vessel 4 floating on the surface of a body of water. The ramp 2 is pivotally secured at its upper forward end of the vessel 4 and extends downwardly and rearwardly to a point adjacent but spaced above the bed of the body of water. It will be appreciated that in very deep water, however, the lower end of the marine ramp 2 may be spaced a substantial distance above the seabed. The ramp 2 could be used in the manner described in the United States Lawrence Patent 3,472,034, curving sharply downwardly into the water to support the pipe in a configuration approaching a caternary, and could be used in conjunction with a tensioning device of the type disclosed in the aforementioned Lawrence patent.

The ramp 2 includes a top support member 6 connected to the vessel 4 by a hitch connection 8 permitting yawing, rolling and pitching motions of the vessel 4 relative to the ramp or at least one of these motions. The ramp 2 also includes a bottom support member 10. The top and bottom support members 6 and 10 are connected by a series of successively spaced, generally similar, intermediate support members 12.

Referring to FIGURES 2 and 3, it may be seen that the intermediate support members 12 are connected to each other by pairs of hinges 14 interposed between the ends of adjacent support members and permitting relative articulation of the adjacent support members in the vertical plane. The top and bottom support members 6 and 10 are also connected to the adjacent intermediate support members 12 by similar hinges 14.

To permit the ramp to be articulated from a convex configuration to a concave configuration relative to the pipe being laid at various points along the length of the ramp, each of the pairs of hinges 14 connecting adjacent support members is so positioned as to space the adjacent end portions of the support members sufficiently far apart to avoid interference between them during relative pivoting motion.

In order to vary the configuration of the ramp, extensible jacks 16 are positioned one each between adjacent support members vertically below the adjacent hinges 14. The jacks 16 are connected at their opposed ends with the adjacent support member and may be extended and retracted in a direction longitudinally thereof to cause relative rotation of the adjacent members about the horizontal pivot axis of the hinges 14.

Each of the support members 6, 10 and 12 includes two opposed, longitudinally extending, closed, hollow main tubes 18 connected by hollow cross tubes 19. The support members are divided internally into a plurality of longitudinally spaced non-communicating buoyant flotation chambers 20 (FIGURE 3). It will be appreciated that at any particular hinge junction between two of the support members, the forces acting to produce a torque about the hinge point include the upwardly acting buoyancy forces of the adjacent support members and the generally downward acting forces exerted by the adjacent portion of the pipe being laid. The forces exerted by the pipe include forces due to the weight of the pipe and the tension on the pipe, and also other forces such as those arising where water currents exert a force in the pipe. These buoyancy and pipe forces exert a torque tending to rotate the support members about their hinge point which must be resisted by a reaction force exerted by the adjacent jack 16 if the desired configuration of the support members is to be maintained.

In a particular feature of the invention the buoyancy forces of the adjacent support members may be separately adjusted so that the support member buoyancy forces acting upwardly may be generally balanced with the pipeline forces acting downwardly so as to minimize the resultant torque required to be reacted by the adjacent jack 16 to minimize the loading thereon in an advantageous manner.

This control of buoyancy of the support members (FIGURE 3) is effected by providing each of the previously mentioned flotation chambers 20 of the various support members with its own flooding valve 22 which may be selectively opened to place the interior of the flotation chamber in fluid communication with the surrounding sea water. There is also provided a flexible first header line 24 extending downwardly along and generally adjacent the ramp. The first header line 24 may have its upper end selectively placed in fluid communication with atmosphere or some similar low gas pressure area. Each of the flotation chambers 20 is also connected with its own gas or air valve 26. Certain of the air valves 26 are connected within the first header line 24 and may be separately, selectively opened to place the interior of the associated flotation chamber 20 in fluid communication with atmosphere so that during flooding of the flotation chamber through the valve 22 (when open) the air within the chamber 20 may be expelled by the incoming water. The other air valves 26, not connected to the first header line 24, are connected to a second header line 28 (similar to the first) which may also be placed in fluid communication with atmosphere to permit flooding of the associated flotation chambers 20 in a similar manner.

In order to empty the flotation chambers 20 after flooding, each of the previously mentioned header lines 24 and 28 may be placed in fluid communication with a conventional source of gas under high pressure (not shown) positioned on the vessel. Opening of one of the air valves 26 when its associated header line is connected to the high pressure gas admits gas under high pressure to the flotation chamber to expel the water through the flooding valve 22 (which must be opened concurrently) to empty the flotation chamber.

The opening and closing of the various valves 26 and 22 may be performed by divers sent down to operate the valves manually. However, the lowermost of the intermediate support members 12 and the bottom support member 10 are provided with additional buoyant portions which may be flooded or emptied in like manner under the remote control of persons on the vessel utilizing remotely controlled flood and air valves, as will be described in more detail hereinafter.

By selective flooding of the various flotation chambers 20, the buoyancy of each of the support members may be selectively controlled in such a manner as to reduce the torque required to be exerted by the adjacent jacks 16 to maintain the ramp in its desired configuration.

In order to provide operators on the vessel with an indication of accurate distribution of the pipe on the ramp, the bottom support member 10 (FIGURE 4) is provided with two longitudinally spaced, vertical load units, generally designed as 32 and 34, adapted to underlie and contact the pipe. These units transmit signals proportionate to the load being exerted upon its units, to signal responsive indication equipment (not shown) adapted to be positioned on the vessel. Load distribution on the longitudinally spaced, vertical load units 32 and 34 gives an indication which may be used to initiate any necessary corrective change in the inclination of the bottom support member to provide a more favorable load distribution for the pipe.

Additionally, signal producing side load indicating units 36 and 38 are also provided adapted to contact the pipe on opposite lateral sides thereof during laying to provide a similar indication of lateral distribution of the pipe on the bottom support member 10.

Supporting member structure

Each of the intermediate support members 12 (FIGURE 2) includes a pair of the previously mentioned identically hollow main tubes 18 which extend longitudinally in laterally spaced opposed relation. The tubes 18 are each closed at their end portions by fixed, closure plates 40 disposed perpendicularly to the longitudinal axis of the tube. A plurality of generally equally, axial spaced diaphragms 42 (FIGURE 3) positioned interiorly of the tubes 18, divide the interior space thereof into a plurality of non-communicating interior chambers 44 of generally equal volume. It will be appreciated that it would be possible to space the baffles 42 unequally to provide chambers of unequal volume.

Connecting each pair of tubes 18 of each support member 12 in fixed relation are a plurality of the previously mentioned longitudinally spaced, laterally extending, U-shaped cross-tubes 19 secured at the upper ends of their vertical limbs to adjacent portions of the tubes 18 perpendicularly thereto. The cross-tubes 19 each include a straight horizontal central portion. The various tubes 19 are hollow and place the laterally adjacent chambers 44 of the tubes 18 in fluid communication so that each of the previously mentioned flotation chambers 20 comprises a pair of the interior chambers 44 of the tubes 18 and the hollow interior of the associated one of the tubes 19. It will be appreciated that the intercommunication between laterally spaced ones of the chambers 44 provided by the tubes 19 ensures laterally symmetrical distribution of buoyancy about the longitudinal axis of the support member.

To support the pipe on the support member 12, at least two sets of rollers 50 (FIGURE 2) are provided and are positioned on the next to the outermost ones of the cross tubes 19. Each set of rollers 50 comprises two upwardly and laterally outwardly inclined rollers having their lower ends rotatably connected by brackets with adjacent portions of the central portion of the adjacent cross tube 19 on opposite sides of the longitudinal axis of the support member 12. The two rollers in each set 50 are also supported at their upper ends for rotation by suitable brackets connected to adjacent portions of the support members and define an upwardly facing V-slot adapted to underlie and rollingly support the pipe. The rollers 50 support the pipe on a vertical level adjacent but a little lower than that of the main tubes 18 and transversely intermediate therebetween. A more detailed description of the sets of rollers 50 is provided in United States Patent No. 3,280,571.

The top and bottom support members 6 and 10 (FIGURES 1 and 3) are generally similar in construction to the intermediate support members 12 insofar as they also include longitudinally extending main tubes 18 connected together by cross members 19, with the flotation chambers 20 being provided in the manner previously described. However, the top support member 6 is provided with a bend in the tubes 18 so that the foremost part of the tubes 18 extends generally horizontally toward the vessel 4 while the rearmost part extends at a downward inclination away into the water. To provide added rigidity for the bent tubing, each of the tubes 18 of the top support member 6 is provided with a hollow tubular, bracing member 52 secured at its forward end to the forwardly directed, horizontal portion of the tubing 18 and at its rearward end to the downwardly bent portion at a point spaced from the lowermost extremity thereof.

Hingedly connected to the forward end plates 40 of the top support member 6 extending transversely therebetween is a generally flat, forwardly extending yoke 53. The yoke 53 is pivotally connected at its lateral mid-point with the previously mentioned gimbal hitch mounting 8 connecting the top support member 6 to the vessel in such a way as to permit yawing, rolling and pitching motions of the vessel without transferring them to the top support member 6, thus avoiding imposing severe environmental stresses on the ramp.

A more detailed description of a gimbal hitch mounting of the type utilized in the preferred embodiment of the invention may be found in the United States Moore Patent 3,462,963. Alternatively, it may be desirable under some circumstances to employ a hitch connection having reduced pivotal freedom in the lateral direction, and a different form of hitch suitbale for this purpose is disclosed in United States Lawrence Patent 3,390,532.

The bottom support member 10 is also generally similar to the previously described intermediate support members 12 but is additionally provided with a supplemental buoyancy platform 60. The supplemental buoyancy platform 60 includes two longitudinally extending closed tubes 62. In the schematic representation of FIGURE 3 it has been necessary for clarity of illustration to displace the tubes 62 laterally from the bottom member 10, although in actuality in the preferred embodiment the tubes 62 are aligned and spaced vertically directly below the adjacent main tubes 18 of the bottom support member 10 in generally parallel relation thereto. The tubes 62 extend from a point adjacent the lowermost end of the bottom support member 10 to a point spaced from the uppermost end thereof and are fixedly connected with the bottom support member by support tubes 64.

The hinge and jack structure

Referring particularly to FIGURES 5 and 6, it will be seen that the previously mentioned hinges 14 for connecting adjacent support members 12 are disposed in pairs with hinges 14 in each pair spaced on opposite sides of the longitudinal axis of the support member and positioned between the aligned ends of the tubes 18. Each hinge 14 includes a vertically disposed male member 70 extending axially from and fixedly secured to the adjacent end plate 40 of one of the tubes 18, having its free extremity received slidably within a female hinge member 74 secured to and extending axially from the end plate 40 of the other tube 18. A horizontally disposed hinge shaft 78 extends through the male and female hinge members 70 and 74 so that they may pivot freely in the vertical plane about a horizontal pivot axis $x$—$x$ concentric with the shaft 78.

The pivot axis $x$—$x$ lies generally along the transverse line defined by the intersection of the median planes of the two adjacent support members. Furthermore, because of the positioning of the pipe being laid, intermediate the main tubes 18 and supported generally on a level therewith by the rollers 50, as previously described, the pivot axis $x$—$x$ is located closely adjacent the median plane of the pipe being laid. Such positioning of the pivot axis is of advantage in further reducing the torque forces exerted on the hinge by the force of the adjacent portion of the pipe being laid.

The dimensions of the male and female hinge members 70 and 74 are such as to space the end plates 40 of the two tubes 18 sufficiently far apart so that both tubes may move freely upwardly and downwardly about the shafts 78 without having their motion impeded by interference between adjacent portions of the opposing end plates. 20. This construction enables any pair of adjacent support members to be articulated to both concave and convex configurations relative to the adjacent pipeline, in an advantageous manner.

An important advantage of the hinged connection described is that it permits the overall length of the ramp to be readily varied by the insertion or removal of additional intermediate support members. This may be simply effected by removing the hinge shafts 78 to separate the affected support members, and by subsequently mating up adjacent hinge members and repositioning and securing the hinge shafts.

To rotate the adjacent support members about the shafts 78 of the hinges 14, the previously mentioned jack 16 is provided. The jack 16 is a conventional mechanical jack of the so-called worm gear type comprising a housing 80 and a plunger 82 extensible axially outwardly of the housing 80 upon application of torque to an input shaft 84 projecting radially out of the housing 80. The input shaft 84 is connected through a conventional worm gear drive (not shown) to threaded portion of the extensible shaft 82 so that selective application of external torque to the shaft 84 (in a manner to be described) to rotate the shaft 84 in clockwise and anticlockwise directions causes linear movement of the shaft 82 relative to the housing in opposite axial directions, in a preferred embodiment the worm gear jack 16 is of the type manufactured by Duff Norton Co. of Charlotte, N.C., under the model designation M–2050–92, although other conventional worm gear jacks may be used.

It will be appreciated that one particularly significant advantage of using a worm gear jack is the mechanical locking action provided by such a jack once the source of torque is removed from the input shaft 84. In this manner a mechanical holding action rigidly maintaining the adjacent support members in fixed relation is provided, and this action does not require any continuous application of fluid pressure to be maintained.

Fixedly secured to the housing 80 on a side remote thereof from the plunger 82 is a female hinge member 86, slidably receiving a male hinge member 88. The remote end of the male hinge member 88 is fixedly secured to a collar 92 extending about the horizontal central portion of the adjacent cross tube 19 of the adjacent support member. A horizontally disposed hinge shaft 90 passes through the male and female hinge members 86 and 88.

Similarly, the free end of the plunger 82 of the jack 16 is connected by male and female hinge members 94 and 96 respectively and a horizontal hinge shaft 98, to a collar 100 passing around the adjacent horizontal central portion of the adjacent cross tube 19 of the other of the support members.

It will be appreciated that extension and contraction of the jack 16 causes rotation of the support members about the hinge pins 78. The hinged mounting for the jack ends provided in the manner described allows the jack to align itself between the two cross tubes 19 as their relative inclination changes in such a manner as to maintain the plunger 82 in axial alignment with the housing 80 to avoid jamming and binding forces being exerted on the jack.

To strengthen the particular cross tubes 19 supporting the hinge connection to the jack, additional bracing is provided. The additional bracing takes the form of two horizontally disposed lower brace tubes 104 connected to the adqacent one of the collars 92 and 100, extending away therefrom in the horizontal plane and diverging laterally outwardly in V-configuration with the remote ends of the lower bracing rods 104 secured to the next succeeding cross tube 19. Additional upper bracing tubes 106 secured to the undersides of the tubes 18 adjacent the respective collars 92 and 100 extend downwardly and away therefrom and converge to intersect the adjacent junction between the lower bracing 104 and the next cross tube 19.

The jacks 16 are operated in the preferred embodiment by the action of an air-powered, reversible impact wrench 110 having an output shaft 112 which is manually connected with the input shaft 84 of the jack 80 by a diver. One particular impact wrench suitable for the present invention is manufactured by Chicago Pneumatic of Utica, N.Y., with the model designation CP–610, through it will be appreciated that other similar impact wrenches may alternately be used. The impact wrench is provided with conventional plug-in type fluid connections (not shown) to mating connection points 114 and 116 (FIGURE 3) provided on the previously mentioned header lines 24 and 28 adjacent to each jack 16. The diver may plug in the wrench 110 and by arranging the high pressure and vent connections on the vessel to the header lines 24 and 28 in correct relation to provide air flow in the requisite direction through the wrench 110, it can be operated to turn the shaft 84 in the desired direction to extend or retract the jack 16 so that the inclination of the support members may be changed. The air leaving the wrench may alternatively be permitted to exhaust directly into the surrounding water.

Although in the preferred embodiment a detachable impact wrench placed in and out of position by a diver is utilized to operate the jacks 16, it will be appreciated that if desired, motors could be permanently coupled to the jacks with a valve connection between the air motor and the header line and remote connections for the operation of the valve connections extending to operators aboard the floating vessel. In this manner it would be possible for the articulation of the jack to be changed remotely from the vessel without any need to send down divers.

The flooding system

The various flotation chambers 20 (FIGURE 3) of the support members 12 may, as previously mentioned, be selectively and separately flooded or emptied of water.

Each of the flotation chambers 20 may be placed in fluid communication with the surrounding sea water by selective opening of the associated one of the previously mentioned flooding valves 22 connected with that particular flotation chamber 20. Additionally, each flotation chamber 20 is connected by a branched conduit 140 (communicating with each of the two tubes 18 defining the chamber) to an associated one of the previously mentioned air valves 26. The location of the flood valve 22 for each flotation chamber is on the underside of the associated cross tubes 19 adjacent the midpoint thereof and the conduit 140 communicates with the top portion of each of the tubes 18. Thus water enters from below and rises upwardly into the chamber to avoid entrapping any air pockets, while on emptying, gravity assists the applied pressure moving the water downwardly out of the chamber. Although the detailed location of these parts on the support members has been omitted from the drawings for clarity, a somewhat similar layout of conduits, flooding and air valves is shown in the previously mentioned United States Lawrence Patent 3,390,532.

The air valves 26 are connected in alternate relation to one or other respect of the first and second flexible header lines 24 and 28, which extend generally along the ramp and upwardly and forwardly therefrom onto the vessel 4. The header lines are secured to the various support members by conventional means (not shown) and sufficient slack looped portions of the header lines are allowed intermediate adjacent support members to accommodate for the hinging motion thereof. At their upper ends either or both the header lines 24 and 28 may be selectively connected through conventional valving apparatus (not shown) to a suitable, conventional source of gas under high pressure adapted to be positioned on the vessel 4, to function as a high pressure line. The header lines may also be selected to communicate with atmosphere to function as a low pressure or vent line. The use of two header lines provides an additional safety factor in the event that one of the lines may become damaged or rendered inoperative in some other manner.

In operation, the ramp is immersed with the various flotation chambers 20 in an emptied condition and with the various flooding valves 22 and air valves 26 closed. If it is desired to reduce the buoyancy of a particular support member to reduce the load on the adjacent jacks, a diver is sent down to the appropriate support member and selects a particular flotation chamber 20 to be flooded. Persons on the vessel connect whichever one of the header lines 24 and 28 is connected with the selected flotation chamber 20 to atmosphere to constitute a vent line. The diver then manually opens the air valve 26 connected with the selected flotation chamber 20 and concurrently opens the associated flooding valve 22. This permits water to enter the flotation chamber 20 to flood it, while the air previously within the chamber is expelled through the now open air valve 26 and the vent line to atmosphere. After the flotation chamber 20 is flooded, the diver then closes the valves.

This process may be repeated, selecting other flotation chambers 20 in turn of that particular support member 12, if it is necessary to still further reduce the buoyancy in order to balance the forces acting about the adjacent hinge.

Emptying of the flotation chambers 20 after flooding thereof in order to increase the buoyancy of a support member is also performed under the control of a diver. As before, the diver selects a desired one of the flotation chambers 20. Persons on the vessel connect whichever one of the header lines 24 and 28 is connected with the selected flotation chamber 20 to the source of high pressure fluid on the vessel to function as a high pressure line. The diver then opens the air valve 26 of the selected flotation chamber 20 and concurrently opens the associated flooding valve 22. The high pressure fluid admitted via the high pressure head line and the air valve 26 expels the water from the particular flotation chamber 20 through the open flooding valve 22. After the flotation chamber has been emptied the diver again closes the valves 22 and 26. This may be repeated to empty any other desired flotation chamber 20.

The arrangement described permits the buoyancy of the support members to be selectively and separately varied while the equipment remains in use to balance the downward pipeline forces and the upward support members' buoyancy forces acting about each of hinges 14 in such a way as to minimize the load required to be reacted by the adjacent jack 16. The desired buoyancy of each support member may be precalculated, knowing the desired configuration, the weight of pipe and the depth at which the support member will be positioned. Then the number of flotation compartments 20 to be flooded in the support members and their location may be precisely determined in advance. In this manner, jack failure through overload may be avoided while the configuration of the ramp may be maintained in an exact manner without overstrain, to provide continued support for the pipe to avoid damage thereto.

Furthermore, additional advantages are provided by utilizing a plurality of noncommunicating flotation chambers 20 spaced along each support member. By making each one of known predetermined volume and by totally flooding or totally emptying each chamber separately it is possible to vary the buoyancy of the support member in known fixed increments of buoyancy without requiring constant monitoring of the amount of water being admitted or to expelled from the total interior volume of the support member. Further by selecting the chambers 20 whose buoyancy is to be varied at particular distances from the hinge it is possible to locate the mean buoyancy forces along the support member in order to provide a predetermined turning moment about the hinge.

In addition to the flotation chambers 20 which may be flooded and emptied under the control of a diver sent down from the surface, the lowermost one of the intermediate support members 12 is provided with a double capacity flotation chamber 142 (having twice the volumetric capacity of one of the flotation chambers 20) which may be selectively flooded and emptied of water under remote control exercised from the floating surface vessel in a manner to be described. The chamber 142 is in fluid communication with a branched conduit 144 (connected to each of the tubes 18) connected to an air valve 146. Air valve 146 is connected through a normally open, manual valve 158 (provided for a purpose to be described) to the header line 28. The opening and closing of the air valve 146 is effected by a conventional pneumatic actuator 148 connected with the air valve 146 and connected by flexible air lines 150 to suitable conventional pneumatic equipment on board the floating vessel. The pneumatic actuator 148 may be selectively controlled by persons on the vessel to open or close the air valve 146. It will be appreciated that although a pneumatic actuator has been disclosed, other forms of remote control actuator such as, for example, hydraulic, or electrical actuators may equally be used to control the opening and closing of the air valve 146 remotely from the vessel.

The opening and closing of a flooding valve 152 connected with the chamber 142, which places the chamber 142 in fluid communication with the surrounding sea water where the valve 152 is open, is similaraly controlled by an actuator 154 connected by flexible, pneumatic control lines 156 to conventional pneumatic control apparatus on the vessel 4.

In operation with the support member 12 immersed and the chamber 142 in an empty condition, flooding is effected in the following manner. The header line 28 is selectively placed in fluid communication with atmosphere to constitute a vent line and the actuators 148 and 154 are actuated remotely from the vessel through their associated control lines to open the air valve 146 and the flooding valve 152, respectively. This permits water to enter and flood the chamber 142.

If it is subsequently desired to empty the now-flooded flotation chamber 142, the header line 128 is connected to the source of gas under pressure so that the header line 28 becomes a high pressure line. The actuators 148 and 154 are then operated concurrently, as previously, so that gas under high pressure expels the water from the chamber through the open flooding valve 152 to empty the chamber. The actuators are then operated to close the valves 146 and 152.

For various reasons, it may sometimes be desired to use the header line 24 as the operative header line in connection with the flooding and emptying of the chamber 142, and for this purpose a normally closed second manual valve 160 is positioned in fluid communication between the header line 24 and the air valve 146. By manually closing the normally open valve 158 and opening the normally closed valve 160, the header line 24 may be placed in fluid communication with the air valve 146 in place of the header line 2. The line 24 may then be utilized for performing the just described sequence of operations occurring during remotely controlled flooding and emptying of the chamber 142.

A similar double capacity buoyancy chamber 143 provided with similar control equipment (not shown) for remote flooding and empting may be provided in the bottom support member 10.

Additionally, the previously mentioned additional buoyancy platform 60 is provided with a branched conduit 164; an air valve 166 controlled by an actuator 168; a flooding valve 172 controlled by an actuator 174; and with manual normally open and normally closed valves 176 and 178, respectively, all of which are equivalent to the corresponding flooding equipment just described provided for the chamber 142. Flooding and emptying of the supplemental buoyancy platform 60 is preferred under remote control from the vessel in a similar manner to that previously described for the double capacity buoyancy chamber 142.

It will be appreciated that remote control equipment for the flooding and emptying of each of the flotation chambers 20 separately, similar to that for the chamber 142, may also be provided. Utilizing this construction, all the flooding and emptying operations necessary could for all the support members, if desired, be performed remotely from the floating vessel.

Remote indication apparatus

In order to provide the operators on the vessel with a remote indication of the configuration of the ramp, each of the support members is provided with a conventional, attitude-responsive, electrical-type inclinometer 190 of the type producing a signal responsive to inclination of the associated support member relative to a predetermined reference plane. The various inclinometers 190 are connected by associated cables 192 to conventional signal-responsive indication equipment adapted to be positioned aboard the floating vessel 4.

Additionally, the supplemental buoyancy platform 60 has connected thereto a Fathometer 194 adapted to produce a signal proportional to distance from the seabed, which is connected by suitable cabling 196 to other conventional equipment for measuring depth adapted to be positioned aboard the floating vessel 4. Depth gauges indicating depth from the surface may also be provided.

Figure 8:
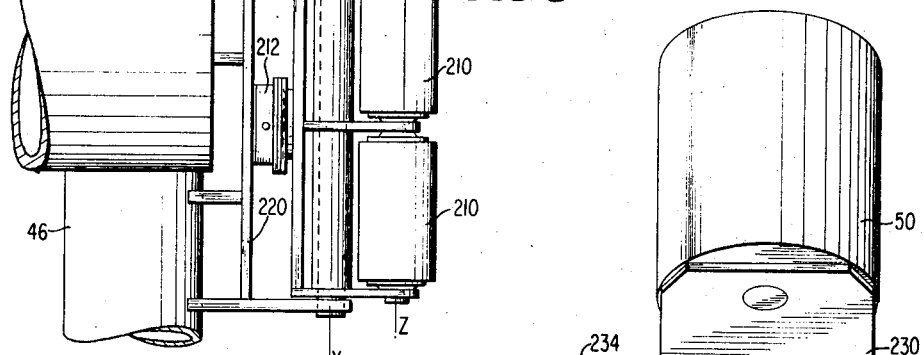
FIGURE 8 is a side view of the side load sensor shown in FIGURE 7.

In order to provide an indication as to whether the pipe is centralized laterally of the bottom support member 10, the previously mentioned side load indicating units 36 and 38 are provided. Referring to FIGURES 7 and 8, the side load unit 36 may be seen to include a support housing 200 fixedly secured to and projecting longitudinally outwardly from the adjacent main tube 18 and the upright portions of the adjacent cross tube 14. The support housing 200 supports a vertical shaft 205 in rearwardly spaced relation from the bottom support member 10. A roller housing 206 is supported on the shaft 205 for rotation about a vertical axis y—y of the shaft 205. The roller housing supports two vertically spaced, vertically extending rollers 210 for rotation about a concentric vertical axis z—z parallel to and spaced rearwardly and transversely inwardly of the axis y—y. The peripheries of the rollers 210 are slightly spaced from and out of contact with the exterior of the pipe being laid when the latter is accurately centered on the support member 10.

Fixedly secured to a portion of the support housing 200 adjacent the vertical midpoint thereof is a cup-shaped housing 212 having a rear wall 214 disposed in a plane perpendicular to the longitudinal axis of the bottom support member 10, and a peripheral wall 216 extending about the edge of the rear wall 214 generally perpendicular thereto. A flexible diaphragm 218 is fixedly secured to the free edge of the peripheral wall 216. The roller housing 206 includes a pressure plate 220 spaced longitudinally on the other side of the axis y—y from the rollers 210 and having a flat face disposed in a plane generally perpendicular to the longitudinal axis of the support member 10. The pressure plate abuts the outer side of the diaphragm 218. Interposed between the rear wall 214 and the inner side of the diaphragm 218 is a load-responsive pressure transducer 222 connected by suitable cabling 224 (FIGURE 3) to a signal responsive load indicator 226 positioned aboard the floating vessel 4.

In operation, if the pipe starts to become laterally decentralized and to move toward the side load unit 36 the pipe moves into contact with the rollers 210 so that the roller housing 206 tends to be rotated about the pivot axis y—y thus causing the pressure plate 218 to load transducer 222 which transmits a signal to the vessel indicative of the change in lateral position of the pipe.

The side load unit 38 which is similar to the side load unit 36 and is connected to a similar indicating unit 228 on board the vessel, will also indicate a corresponding change in lateral pipe position but in the opposite sense. An operator, viewing the indicators 226 and 228 on board the vessel, will thereby be informed that the pipe is becoming asymmetrically, laterally distributed on the bottom support member 10 and may be enabled to take appropriate corrective action.

In the preferred embodiment, the load transducers 222 used are manufactured by Martin-Decker Corporation of Long Beach, Calif., under the designation CC–0250–25, though other load transducers may equally be used.

Figure 9:
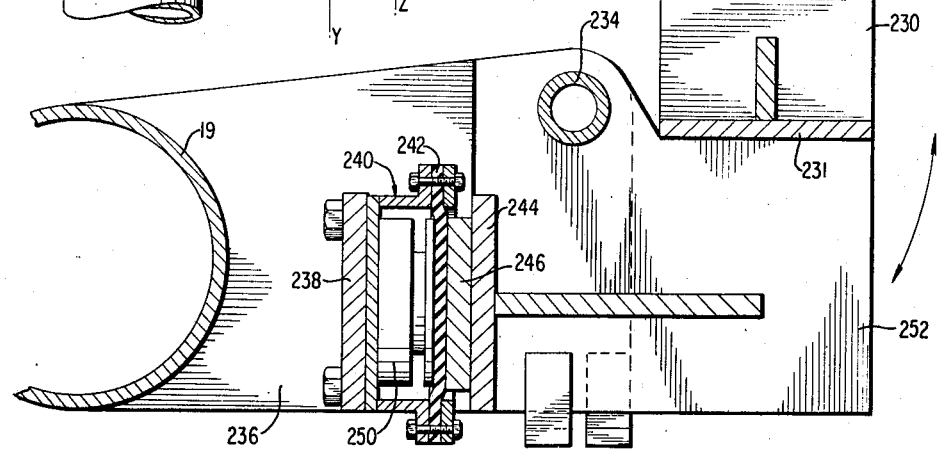
FIGURE 9 is a cross-sectional, side view of a portion of the bottom support member shown in FIGURE 4 taken along the lines 9—9 therein.

With respect to vertical asymmetry of the pipe on the bottom support member, reference should be made to FIGURES 4 and 9. The load unit 32 includes a pair of the previously described V-oriented rollers 50, with each of the rollers at its upper end being supported by a bracket 229 secured to the adjacent main tubes 18. The brackets 229 though generally rigid possess limited yieldability to permit minor deflections of the rollers 50 under pipe load. The rollers 50 at their lower ends are supported on each of two inclined brackets 230. The brackets 230 have their upper edges aligned in abutting contact along the longitudinal centerline of the support member and extend downwardly and transversely outwardly on opposite sides therefrom. The lower ends of the brackets are fixedly secured to a transversely extending horizontally disposed cross plate 231 supported by two transversely spaced, vertically and longitudinally extending support plates 232 (FIGURE 4). The two support plates 232 are supported for rotation about a horizontal axis on a horizontally positioned shaft 234. The shaft 234 is supported at its extremities by two vertically and longitudinally extending brackets 236 disposed in spaced-opposed relation on opposite sides of the longitudinal axis of the bottom support member 10 and extending forwardly to the next adjacent cross tube 19, to which they are fixedly secured.

Fixedly secured to and extending transversely between the support brackets 236 is a vertically and transversely extending support plate 238 having a dish-shaped housing 240 secured to its rearward face provided with a resilient diaphragm 242 enclosing the open face of the housing 240. Interposed within the housing 240 between the rear face thereof and the diaphragm 242, is a load-responsive transducer 250 similar to the previously described transducer 222.

Secured to the forward end of the support brackets 232 is a vertically and transversely extending cross plate 244 supporting on its forward face a pressure plate 246 abuttingly contacting the adjecent face of the resilient diaphragm 242. As the vertical load imposed by the pipe on the rollers 50 varies, the support brackets 232 tend to be rotated in one or other direction about the shaft 234 to vary the load imposed by the pressure plate 246 upon the transducer 250. The transducer 250 is coupled by an appropriate connection line 252 to conventional remote indicating apparatus 254 positioned on the floating vessel.

The load unit 34 is similar to the vertical load unit 32 and includes a load transducer 256 and a remote indicator 258 on board the vessel. If the pipe starts to bend vertically away from the support member in an incorrectly distributed configuration, one or other of the load units 32 and 34 will experience a greater load so that an observer on board the vessel monitoring the indicators 254 and 258 will be informed of the situation and can take appropriate corrective action.

The two sets of vertical and side indicator units 32, 34 and 36, 38 respectively, may also be used cooperatively to determine whether the pipe is still on the bottom suport member, if vertical load indication suddenly ceases for some reason. This might be due to the pipe floating vertically off the vertical load units into an unsupported condition, still between and not contacting the side load units 36 and 38. In this event a slight movement imparted to the ramp to move one of the side load units against the pipe would give an indication of position if the pipe was still in the immediate area of the bottom member, if not no indication would result. Assuming an affirmative indication of lateral contact was provided, the buoyancy of the bottom support could be increased to bring the vertical load units and associated support structure back into underlying contact with the pipe. Thus, it is possible to check that the pipe remains in the bottom support member 10 and to adjust the degree of support buoyancy remotely for it as necessary without having to send down divers to make a visual assessment and local adjustment.

SUMMARY OF ADVANTAGES

It will be appreciated that in constructing a marine apparatus for supporting flexible elongate pipe means during underwater laying thereof according to the present invention, certain significant advantages are provided.

In general, the ramp offers a unique combination of advantages including the ability to be changed in its configuration during an actual laying operation to control pipe stress and structural rigidity in any desired concave or convex configuration consistent with field terminology and, for purposes of definition, the side elevational configuration of the ramp, extending between the hinge 8 and the outermost support member 10, may be considered as the ramp "profile." Moreover, the length of the ramp may be easily varied by changing the number of members and the attitude of it may be remotely monitored.

Of particular significance is the provision of an articulated ramp comprising hingedly connected, partially buoyant support members connected by jacks wherein the buoyancy of the various support members may be selectively adjusted to reduce the loading on the various jacks. In this manner, the possibility of a jack failure is significantly reduced and lighter jacking equipment may be used.

Furthermore, the use of worm gear type jacks provides a mechanical locking action which does not require the maintenance of hydraulic pressure on the jacks.

Additionally, the possibility that jack failure may occur permitting the adjacent support members to assume a configuration which might be such as to cause cracking of the pipe, is effectively minimized or reduced.

Other important advantages are afforded by the flooding system which permits the various flotation chambers not only to be flooded to decrease buoyancy but, if so desired, permits them to be emptied at later times to increase the buoyancy again if this should be needed.

In this respect it is further significant that the buoyancy may be varied by using noncommunicating buoyancy chambers of predetermined capacity which may be totally flooded or emptied to alter the buoyancy in predetermined buoyancy increments, without requiring visual observation.

Also particularly significant in this connection is the provision of remotely operable flooding apparatus which permits the buoyancy of cetrain of the support members to be changed under remote control from the vessel without any need to send down divers.

Of further importance is the location of the jacks in a position generally centrally of the hinges connecting adjacent support members so that the jacks are afforded a certain measure of protection against damage by the surrounding structure.

Other advantages are provided by the vertical and sideward load units provided on the bottom support member which provide an operator on the surface vessel with information from which asymmetric distribution of the pipe on the bottom support member may be easily determined so that corrective action can be taken.

Although a preferred embodiment of the invention has been shown and described, many modifications thereof may be made by a person skilled in the art without departing from the spirit of the invention, and it is desired to protect, by Letters Patent, all of the inventions falling within the scope of the following claims.

We claim:
1. Marine apparatus for supporting flexible elongate pipe means during underwater laying thereof from a vessel floating on the surface of a body of water, said apparatus comprising:
   a longitudinally extending, elongate ramp adapted to be secured at one end thereof to the vessel and extend away therefrom generally downwardly into the water;
   said ramp including,
      a plurality of longitudinally spaced support members,
      each said support member including at least one closed hollow chamber portion to provide said support member with at least partial buoyancy;
   means for connecting adjacent support member, said means including
      pivotal connection means positioned between at least one pair of adjacent support members for permitting relative vertical motion therebetween about a generally horizontal pivot axis;
   at least one torque applying means connected with said pivotal connection means for applying torque thereto to selectively vary the relative inclination of the adjacent support members and to maintain said support members in a predetermined relative inclination;
   pipe contacting means secured to and spaced along said ramp and adapted to underlie and support the elongate pipe means; and
   buoyancy control means connected with said support members for selectively and separately causing the passage of water between the interior and exterior of the hollow chamber portion of at least one of said support members to selectively and separately vary the buoyancy thereof;
   said buoyancy control means and said torque applying means cooperating to define means operable to selectively adjust the pivot inducing load imposed from pipe means through adjacent support members on pivotal connection means positioned therebetween;
   said buoyancy control means and said torque applying means being concurrently and independently operable to cause the buoyancy of said ramp to be adjusted longitudinally along at least a portion of said ramp independently of the profile of said ramp while said torque applying means remains operable to constrain said support members to define a ramp profile of predetermined and selectively adjustable configuration.

2. A marine apparatus as defined in claim 1:
   wherein said pivotal connection means includes
      two hinge means spaced laterally on opposite sides of the longitudinal axis of said ramp,
      said hinge means having their respective hinge axes aligned with said horizontal pivot axis, and
   wherein said torque applying means includes
      jack means fixedly connected at opposite ends thereof with each of the adjacent pair of support members,
      said jack means being spaced laterally intermediate said hinge means,
      said jack means being spaced vertically from said pivot axis for selective extension and retraction of said jack means in a direction longitudinal of said support members to rotate the support members relatively about said horizontal pivot axis.

3. A marine apparatus as defined in claim 2 further including,
   power responsive, drive and locking means included in said jack means for selective extension or retraction, and locking thereof,
   a power source adapted to be positioned on the floating vessel, and
   a power connection means extending between said power source and said drive means for selective application of power thereto to operate said jack means.

4. A marine apparatus as defined in claim 2:
   wherein at least said one pair of said support members further includes
      opposed, vertically and laterally extending end portions, and
   wherein said pivotal connection means, which is fixedly connected with each of said end portions, serves to space said end portions sufficiently apart to permit the relative vertical inclination between said adjacent support members to be varied from an acute to an obtuse angle without interference between said adjacent end portions.

5. A marine apparatus as defined in claim 2 further including:
   a plurality of load responsive sensors connected with at least one of said support members,
   each of said load responsive sensors being adapted to be contacted by the elongate pipe means to cause a signal to be developed proportional to the load developed on each said sensor by the pipe means,
   said load responsive sensor being positioned generally symmetrically of the longitudinal and lateral axis of said support member, and
   signal responsive indicator means adapted to be positioned on the vessel in operative connection with said sensors whereby asymmetric distribution of the pipe means on said ramp is indicated on the vessel.

6. A marine apparatus as defined in claim 5:
wherein said load responsive sensors include
first and second vertical load sensors spaced longitudinally of said ramp,
said first and second vertical load members being positioned to generally underlie said elongate pipe means and to produce signals proportional to the loads exerted on support member by said pipe means, and
first and second side load sensors secured to said support member and positioned laterally on either side of the longitudinal axis of said support member,
said side load sensors being adapted to be contacted by the elongate pipe means on opposite sides thereof to produce a signal proportional to the side loading of said pipe means on said support member.

7. A marine apparatus as defined in claim 2:
wherein said flooding means includes
flexible conduit means extending generally along said ramp, and
first connecting means positioned on the vessel, said first connecting means being selectively connectable with said flexible conduit means to place said flexible conduit means in alternate fluid communication with atmosphere and a source of pressurized gas; and
a source of gas under high pressure positioned on the vessel, and
second connecting means positioned on the vessel for selective connection with said conduit means when said first connecting means is disconnected, for placing said conduit means in fluid communication with said source of gas under high pressure;
a plurality of longitudinally spaced, noncommunicating, closed, hollow flotation chambers provided by said support members;
a plurality of flooding valve means, each said flooding valve means being connected with one of said flotation chambers for selectively and separately placing said flotation chamber in fluid communication with the surrounding water; and
a plurality of gas valve means, each said gas valve means being connected with one of said flotation chambers for selectively and separately placing said flotation chamber in fluid communication with said conduit means.

8. Marine apparatus for supporting flexible elongate pipe means during underwater laying thereof from a vessel floating on the surface of a body of water, said apparatus comprising:
a longitudinally extending, elongate ramp adapted to be secured at one end thereof to said vessel and extend away therefrom, generally downwardly into the water, said ramp including,
a plurality of longitudinally spaced support members,
each said support member including a plurality of closed hollow chamber portions to provide said support member with at least partial buoyancy;
means for connecting adjacent support members, said means including,
pivotal connection means positioned between at least one pair of adjacent support members for permitting relative vertical motion therebetween about a generally horizontal pivot axis, and
at least one torque applying means connected with said pivotal connection means for applying torque thereto to selectively vary the relative inclination of said adjacent support members and to maintain said adjacent support members in a predetermined relative inclination;
pipe contacting means secured to and spaced along said ramp and adapted to underlie and support said elongate pipe means; and
buoyancy control means connected with said support members for selectively and separately causing the passage of water between the interior and exterior of said hollow chamber portions of said support members to selectively and separately vary the buoyancy of said support members;
said buoyancy control means and said torque applying means cooperating to define means operable to selectively adjust the pivot inducing load imposed from pipe means through adjacent support members on pivotal connection means positioned therebetween;
said buoyancy control means and said torque applying means being concurrently and independently operable to cause the buoyancy of said ramp to be adjusted longitudinally along at least a portion of said ramp independently of the profile of said ramp while said torque applying means remains operable to constrain said support members to define a ramp profile of predetermined and selectively adjustable configuration.

9. A method of laying flexible elongated pipe means from a vessel floating on the surface of a body of water utilizing a ramp formed from a plurality of hingedly connected support members, each provided with a plurality of non-communicating closed hollow chambers, the method comprising the steps of:
arranging the support members in predetermined relative inclination extending downwardly into the water from the floating vessel;
maintaining jack means between adjacent support members to maintain the predetermined relative inclination thereof;
supporting the flexible elongated pipe means on the support members and;
selectively adjusting the buoyancy of at least one of said support members and in response to said adjusting, adjusting the pivot inducing load transmitted from said pipe means through said support members to at least one of said jack means;
said adjusting of the buoyancy of at least one of said support members being operable to adjust the buoyancy of said damp longitudinally along at least a portion thereof while said jack means constrains said support members to define a ramp profile of predetermined and selectively adjustable configuration.

10. Apparatus for laying a pipeline in a submerged surface, said apparatus comprising:
buoyant ramp means operable to support a portion of a pipeline intermediate a floating vessel and a submerged surface;
vertical sensing means operable to sense vertical force interacting between said ramp means and said pipeline;
means operable to adjust vertical force interacting between said ramp means and said pipeline;
lateral sensing means operable to sense lateral force interacting between said ramp means and said pipeline; and
means operable to adjust lateral force interacting between said ramp means and said pipeline.

11. Marine apparatus for supporting flexible elongate pipe means during underwater laying thereof from a vessel floating on the surface of a body of water, said apparatus comprising:
a ramp operable to be pivotably supported by a floating vessel and adapted to underlie and support an elongated pipe means;
vertical sensor means connected with said ramp and adapted to underlie the pipe means and produce a remote indication of the vertical load imposed by the pipe means on said ramp means;
side sensor means connected with said ramp and adapted to be contacted by the pipe means upon transverse movement thereof and produce a remote indication of said transverse movement; and variable buoyancy means connected with said ramp for varying the buoyancy thereof.

12. Marine apparatus for supporting flexible elongate pipe means during underwater laying thereof from a vessel floating on the surface of a body of water, said apparatus comprising:

a ramp having a plurality of longitudinally extending support members connected end to end, said members being adapted to underlie and support an elongated pipe means;

vertical sensor means connected with one of said support members and adapted to underlie the pipe means for producing a remote indication of the vertical load imposed by the pipe means on said one support member;

side sensor means connected with said one support member adjacent the position occupied by the pipe means when said pipe means is generally centrally disposed along said one support member;

said side sensor means being adapted to be contacted by the pipe means upon transverse movement thereof to produce a remote indication of said transverse movement; and variable buoyancy means connected with said one support member for varying the buoyancy thereof.

References Cited

UNITED STATES PATENTS

| | | | |
|---|---|---|---|
| 3,280,571 | 10/1966 | Hauber et al. | 61—72.1 |
| 3,438,213 | 4/1969 | Broussard et al. | 61—72.3 |

FOREIGN PATENTS

| | | |
|---|---|---|
| 925,432 | 5/1963 | Great Britain. |
| 625,728 | 9/1961 | Italy. |

JACOB SHAPIRO, Primary Examiner